United States Patent Office 3,640,941
Patented Feb. 8, 1972

3,640,941
ADHESIVE COMPOSITION
Harold J. Findley and James L. Meier, Eaton, Ohio,
assignors to Whittaker Corporation
No Drawing. Filed May 8, 1970, Ser. No. 35,915
Int. Cl. C08f 45/28, 45/30
U.S. Cl. 260—33.6 A    17 Claims

ABSTRACT OF THE DISCLOSURE

An adhesive composition which is particularly useful for bonding vulcanizable rubber to metal surfaces comprises (a) a graft polymer formed from the combination of polybutadiene or halogenated polybutadiene and substituted cyclopentadiene monomer, (b) dibasic lead phosphite, (c) resorcinol, and (d) a volatile organic solvent for the graft polymer. The polybutadiene and substituted cyclopentadiene reactants are reacted at an elevated temperature between about 110° C. and about 165° C. until substantially all of the substituted cyclopentadiene is grafted onto the polybutadiene.

After this adhesive composition is coated on a metal surface, vulcanizable rubber is placed in contact with the coated metal surface and the resulting structure is cured.

BACKGROUND OF THE INVENTION

This invention relates to adhesive compositions which can be employed to bond rubber to metals, and to the composite products so produced.

Heretofore, rubber has been bonded to metal parts by employing either a single-coat or a double-coat method. The single-coat method may comprise using a mixed polymer system in which one polymer has an affinity for rubber and the other polymer has an affinity for metal or it may comprise using a single polymer which has an affinity for both rubber and metal. Regardless of which of the single-coat procedures is used, this method, as heretofore employed, has had several disadvantages. Among these are a tendency for the adhesive layer to promote corrosion in the metal at the bond line, a failure to provide optimum adhesion, and a lack of versatility for bonding a variety of rubber stocks. Additionally, previously-employed adhesive polymers have generally produced less than optimum adhesion when the bonding operation was conducted at temperatures above about 330° F.

The aforementioned two-coat method involves first applying a primer coat to a metal surface to pacify it and then applying a second coat of a material which adheres well to rubber. A particular disadvantage of this method is that it requires two separate applications of dissimilar adhesive formulations.

SUMMARY OF THE INVENTION

The adhesive composition of this invention comprises (a) 100 parts by weight of graft polymer synthesized by combining solid polybutadiene or halogenated polybutadiene with substituted cyclopentadiene in a specific molar ratio, (b) about 25 parts to about 150 parts by weight of dibasic lead phosphite, (c) about 2.5 parts to about 25 parts by weight of resorcinol, and (d) a solvent for the graft polymer. This composition may also include dispersing agents, film-reinforcing agents, and fillers to further improve its adhesive characteristics.

The herein-described adhesive composition is applied to a metal surface and dried, after which a vulcanizable rubber surface is placed in contact therewith. The resulting composite structure is cured to produce a strong rubber-to-metal bond.

Bonding surfaces together using the adhesive composition of this invention has several advantages. One advantage is that only a single coat of adhesive is required. That is, the herein-described adhesive adheres well to both rubber and metal without the use of separate metal adherents such as epoxy and phenolic resins, polyisocyanates, cyclized polyisoprene or silanes. This dispenses with a second coating step as required in the previously-described, prior art two-coat method, while providing a substantially stronger bond than has heretofore been possible with single-coat bonding methods. A further advantage is that, even though only a single coat is herein employed, metal bonding by this method is not subject to corrosion, even under extreme environmental conditions.

Another advantage of this invention is that a wide variety of rubber stocks can be successfully bonded by the herein-described adhesive composition. Furthermore, optimum adhesion can be produced at bonding temperatures up to about 400° F.

DESCRIPTION OF THE PREFERRED EMBODIMENT

As used herein and in the claims, the term "rubber" includes both natural and synthetic rubbers and derivatives of natural rubber. Examples of natural rubbers and derivatives thereof are hevea rubber and gutta percha. Examples of synthetic rubbers capable of being successfully bonded to metal are: styrene-butadiene rubber (SBR), nitrile, polybutadiene, polyisoprene and polychloroprene. Additionally, as used herein, the term "rubber" designates vulcanizable, as opposed to vulcanized, rubber. The term "metal" is used in its usual sense and includes copper, iron, steel, titanium, aluminum, and brass.

Unless otherwise indicated, concentrations given herein and the claims as "parts" are "parts by weight per 100 parts by weight of graft polymer."

CONSTITUENTS

In general, the adhesive composition of this invention minimally contains, as necessary components for metal-rubber bonding: (a) a graft polymer synthesized from (1) solid polybutadiene or halogenated polybutadiene (hereafter sometimes collectively referred to as the "polybutadiene moiety") and (2) substituted cyclopentadiene monomer in specific molar ratios; (b) dibasic lead phosphite; (c) resorcinol; and (d) a solvent for the graft polymer. Various other components such as fillers, dispersing agents and film reinforcing agents may be added to the combination of (a), (b), (c) and (d) to further enhance the bonding characteristics of (a), (b) and (c).

(A) Graft polymer

The polybutadiene moiety used herein is a solid polymer and has a molecular weight between about 2000 and about 250,000 and preferably, about 150,000. Below and above these molecular weight limits, respectively, effective adhesion of rubber to metal is not obtainable.

The halogens employed in the halogenated polybutadiene form will usually include chlorine or bromine although fluorine could also be used. Mixed halogenation may also be employed in which case the halogenated polybutadiene carries more than one halogen substituent thereon. For example, the halogenated polybutadiene may simultaneously carry both chloride and bromide substituents thereon. Halogenation of polybutadiene may be obtained by any well-known method such as bubbling gaseous halogen through a heated solution containing polybutadiene or by reacting the polybutadiene with a halogen-bearing material such as N-halosuccinimide, e.g., N-bromosuccinimide. Halogenation by gaseous halogen results primarily in ethylenic addition of halogen to the polybutadiene (approximately one mole of halogen to six butadiene monomer units) whereas the use of N-halosuccinimide results in allylic addition of halogen. In any case, the amount of halogen in the halogenated polybutadiene may range from zero percent up to about 50% by weight of the weight of polybutadiene. Above about 50% by weight of halogen, polymer gelation occurs. Preferably, the amount of halogen added is about 22% to about 30% by weight of the weight of polybutadiene. Within this preferred range, substantially the same strength of bond is obtained as when using permissibly higher degrees of halogenation without the added cost of the increased halogenation.

Although effective bonding is obtained using polybutadiene within the aforementioned molecular weight limit, it is preferable to use halogenated polybutadiene. The latter provides a significant improvement in bond characteristics over polybutadiene.

The monomeric component of the graft polymer is substituted cyclopentadiene. By "substituted" is meant derivatives of cyclopentadiene such as hexachlorocyclopentadiene, hexabromocyclopentadiene,1,2,3,4-tetrachloro-5,5-dimethoxycyclopentadiene,2',3',4',5' - tetrachloro - 1,3-dioxalane-2-spiro cyclopenta-2', 4'-diene. The use of cyclopentadiene itself, as the monomer constituent of the graft polymer, results in an adhesive which is much too weak to be of any practical significance for the herein described purposes. By contrast, the use of substituted cyclopentadiene results in a highly effective adhesive. For example, the bond produced when using hexachlorocyclopentadiene is several times stronger than that resulting from the use of cyclopentadiene, as shown by comparing cements E and G (Example 3 and Table 3) which differ only in this respect.

The amount of substituted cyclopentadiene in the graft polymer varies between about 0.2 and about 1.5 moles for every 3 butadiene monomer units. Below the ratio of about 0.2:3, the metal adhesion is poor whereas above the ratio of about 1.5:3, the rubber adhesion is poor. Preferably, a ratio of substituted cyclopentadiene to butadiene monomer units of about 0.6:3 is employed.

(B) Dibasic lead phosphite

Dibasic lead phosphite is employed herein as an acid acceptor and corrosion inhibitor. During curing of the herein-described adhesive, acid residues are produced. These residues are presently believed to comprise hydrogen chloride. If allowed to remain in active form, they will attack the metal, causing metal loss with consequent loosening of the adhesive from the metal. The dibasic lead phosphite combines with the acid residue to neutralize the latter, thereby preventing corrosion of the metal and preserving the integrity of the adhesive-to-metal bond. The bond between this adhesive and non-metallic surfaces, e.g., rubber, is also substantially improved by neutralization of the acid residue.

The concentration of dibasic lead phosphite varies between about 25 parts and about 150 parts by weight per 100 parts by weight of graft polymer, with a preferred upper limit being about 100 parts. Preferably, the adhesive composition contains about 75 parts. Below about 25 parts of dibasic lead phosphite, failure of the metal-adhesive bond occurs because there is insufficient phosphite to bind up the acid residue and prevent it from attacking the metal. Above about 150 parts, the graft polymer is, in effect, too diluted to provide an effective bond. An upper limit of about 100 parts is preferred because amounts of phosphite above this limit provide no further improvement in bonding.

(C) Resorcinol

The inclusion of resorcinol in this adhesive results in a substantial improvement in its bonding characteristics as compared with the adhesion of the graft polymer and dibasic lead phosphite alone. The increase in adhesion due to the presence of resorcinol may range from 50% to almost 200% depending upon the rubber stock being bonded. This is shown in Table 3 by comparing the test data obtained from tests of cement A (graft polymer and dibasic lead phosphite) and cement B (same graft polymer, dibasic lead phosphite and resorcinol) which were identical cements except for the presence of resorcinol in cement B.

Resorcinol provides the foregoing improvement when employed in amounts between about 2.5 parts and about 25 parts. Below about 2.5 parts, the resulting adhesive is unsuitable for bonding purposes because of its poor adhesion. Above about 25 parts, the small improvements in adhesion derived from additional amounts of resorcinol are not warranted by its cost and, furthermore, it imparts brittleness to the adhesive making the latter less useful. Preferably, the resorcinol is employed in amounts between about 7.5 parts and 15 parts.

(D) Solvent

The organic solvent serves as a solvent for the graft polymer with the dibasic lead phosphite and resorcinol being dispersed therein. Various organic solvents may be used including aromatics such as xylene, toluene and ethyl toluene, ketones such as methyl ethyl ketone and methyl isobutyl ketone; and chlorinated solvents such as 1,1,1-trichloroethane and perchloroethylene. Blends of these solvents may also be used. Preferably, an amount of solvent is used which will produce an adhesive composition which has minimal volume for shipping purposes, but which is sufficiently fluid to be easily applied, for example, by brushing, to a surface to be bonded. In general, sufficient solvent is employed to give about a 20%–30% (wt.) solids solution.

(E) Optional ingredients

As previously described, the excellent adhesion obtained with the adhesive composition of this invention may be enhanced by the inclusion of agents such as dispersing agents and film reinforcing agents. As dispersing and antisettling agents, silica such as fumed silica and silicates such as sodium aluminosilicate may be used. An additional advantage is obtained with these particular dispersing agents when both resorcinol and formaldehyde donor are included in the adhesive composition. A reaction which is presently not understood occurs between the silica or silicate and the resorcinol and formaldehyde donor which results in enhanced adhesion. The silica and silicate is employed in amounts between about 1 part and about 15 parts. Outside this range, the effectiveness of the silica or silicate is significantly lessened. A preferred concentration is about 10 parts.

A formaldehyde donor may be included to enhance adhesion. The formaldehyde donor may include paraformaldehyde, trioxane and hexamethylenetetramine. It is used in amounts between about 0.1 part and about 16 parts with a preferred concentration of about 0.4 part. Outside this concentration range, the presence of the formaldehyde donor is not effective.

Carbon black may be included in the adhesive composition as a film reinforcing agent. Either acid or alkaline carbon black may be used. The concentration of carbon black ranges between about 1 part and about 15 parts with a preferred concentration being about 7.5 parts. Below and above this concentration range, the carbon black is relatively ineffective.

Preparation of the adhesive

Preparation of the adhesive of this invention will now be described. In general, the polybutadiene moiety and the substituted cyclopentadiene are solubilized in an organic solvent in relative amounts such that the molar ratio of these components in the graft polymer falls within the range of about 0.2–1.5 moles of the substituted cyclopentadiene to every 3 monomer units in the polybutadiene chain. Preferably, the reaction medium contains an amount of polybutadiene moiety which is in slight excess of that required to provide a graft polymer with the foregoing ratio to ensure that substantially all of the substituted cyclopentadiene is reacted.

The resulting mixture is heated for a time sufficient to react substantially all (generally about 90% or higher) of the substituted cyclopentadiene. In general, the graft reaction solution is heated to a temperature between about 110° C. and about 165° C. Within this temperature range, the graft reaction can usually be completed in 48 hours or less. The particular graft reaction temperature and the time required to substantially complete the reaction depend to some extent upon the substituted cyclopentadiene. More specifically, when hexachlorocyclopentadiene is employed, the graft reaction is preferably carried out at temperatures between about 140° C. and about 165° C. Above about 165° C., a gel is produced which is unuseable. Below about 140° C., formation of the graft polymer employed herein becomes very difficult and the time required becomes inordinately long. By comparison, when using hexabromocyclopentadiene, the graft reaction temperature employed is at the lower end of the 110° C.–165° C. temperature range. Below about 110° C., the grafting of the hexabromocyclopentadiene to the polybutadiene moiety is poor, with consequent loss in adhesion. At temperatures about 140° C., a gel is formed.

The reaction is continued for a time sufficient to substantially complete the graft reaction. This can be determined by taking samples of the graft polymer at increasing time increments and analyzing these samples for, for example, solids content, inherent viscosity and percent halide as described in Example 1. Since it can be calculated by those skilled in the art what the solids content and percent halide content of the graft polymer should be when the graft reaction is complete, the test results can be compared to the calculated solids and percent halide content and the degree of reaction thereby determined. The substantial completeness of the graft reaction is also indicated by the substantial disappearance of the odor of the substituted cyclopentadiene.

The solvent used during the graft reaction is preferably one which is also a solvent for the graft polymer. This avoids the added step of having to completely separate the reaction solvent from the graft polymer. Additionally, the graft reaction solvent should be one which has a boiling point above the graft reaction temperature.

After the reaction is completed, the resulting batch is usually concentrated by distilling off some of the solvent to provide a product which will have the desired solids concentration when the dibasic lead phosphite and other aforedescribed components are added thereto. Because it is preferred to have the graft polymer dissolved in a volatile solvent for ease of use, the solvent present in the graft reaction product can be evaporated sufficiently to provide a higher solids content than 20–30% and a more volatile solvent can then be added to provide the desired solids content. For example, the reaction solvent may be ethyl toluene and the added volatile solvent may be methyl ethyl ketone. In this case, the adhesive composition would contain a pair of solvents.

The dibasic lead phosphite and resorcinol are added to the graft polymer-solvent solution in amounts within the concentration ranges set forth above. Preferably, both components are homogeneously dispersed throughout the solvent to provide optimum adhesion. The other aforedescribed components may be added to this adhesive composition and, if so, they are preferably homogeneously dispersed therethrough. Solvent can be added at any point to provide an adhesive product having the desired solids content.

The adhesive composition is applied to a metallic surface, preferably after the latter has been prepared for bonding, i.e., preferably after it has been cleaned and roughened by gritblasting. The coating on the metal surface is allowed to dry, after which a vulcanizable rubber surface can be placed in contact with the dried adhesive and compressed thereagainst at elevated temperature as is well-known in the art to thereby cure the adhesive.

The bond produced using the herein-described adhesive composition adheres so strongly to both rubber and metal that failure during mechanical testing of rubber-adhesive-metal composites occurs substantially always in the rubber and not in the adhesive layer.

Optimum bond strength is produced when the vulcanizable rubbers are relatively unsaturated. When the degree of unsaturation is less than about 5 mole percent, rubber is difficult to bond.

This invention will be further described by the following examples.

EXAMPLE 1

This example illustrates the chlorination of polybutadiene and the synthesis of the graft polymer from the chlorinated polybutadiene and hexachlorocyclopentadiene.

162 grams of milled polybutadiene with an average molecular weight of 150,000 was added to 2500 cc. of 1,1,1-trichloroethane in a 3000 cc. resin kettle fitted with stirrer, condenser, thermometer and heating mantle. The batch was heated to reflux and stirred until the polybutadiene dissolved. 0.15 gm. of hydroquinone, a free radical inhibitor, was added. The batch was dehydrated by distilling off 200 cc. of a solvent-water mixture. 36.4 gms. of gaseous chlorine were bubbled into the solution at 70° C. After the chlorination, the batch was purged with dry nitrogen for 30 minutes. The 1,1,1-trichloroethane was vacuum distilled off, and gradually replaced with 2000 cc. of ethyl toluene. After the distillation, 37.5 cc. of epichlorohydrin, an HCl scavenger, and 191 gms. of hexachlorocyclopentadiene were added to the bath. The batch was heated to 150° C. with stirring, and held at 150° C.±5° for 48 hours. The batch was then concentrated by vacuum distilling off 1200 cc. of ethyl toluene. 1.0 gm. of 2,6-ditertiary-butyl-p-cresol, and 5.0 cc. of epichlorohydrin were added as stabilizers. The preparation yielded 335 gms. of polymer solids.

Samples were taken from the reaction mixture at the time intervals shown below in Table 1. Each sample was subjected to analysis to determine its inherent viscosity (at about 70° F.), percent chloride in graft polymer, and percent solids. The test data are also included in Table 1.

TABLE 1

| Graft reaction time (hr.) | Inherent viscosity (70° F.) | Percent Chloride | Percent Solids |
|---|---|---|---|
| Polybutadiene starting material | 1.68 | 0 | |
| 0 (chloropolybutadiene; no grafting) | 1.48 | 9.64 | 9.47 |
| 12 | 0.82 | 32.20 | 13.62 |
| 24 | 0.62 | 36.60 | 15.17 |
| 36 | 0.56 | 39.12 | 16.14 |
| 48 | 0.54 | 40.00 | 16.71 |

EXAMPLE 2

This example illustrates the synthesis of a graft polymer from hexachlorocyclopentadiene and chlorinated, brominated polybutadiene.

The preparation was identical to Example 1 except that following the chlorination and purging with nitrogen, vaporized bromine was introduced into the kettle with vigorous stirring at 25° C.–35° C. to produce a mixed halogenated polybutadiene polymer. The order of chlorination and bromination may be reversed with similar results. Alternatively, similar results have been produced by allylically brominating (after chlorinating) using N-bromosuccinimide.

EXAMPLE 3

This example illustrates the effective bond produced between various rubbers and hot rolled steel using various adhesive formulations of this invention and prior art adhesive formulations.

Tensile and peel test specimens were made up and the appropriate tests were conducted as modifications of ASTM D–429, Methods A and B, respectively, as follows.

Tensile test: One inch diameter steel buttons were gritblasted and then degreased with MEK. The adhesive formulation was then applied by brushing onto the gritblasted surfaces, and allowed to dry. A ¼" thick rubber stock was cured between each pair of such buttons using a 12 cavity transfer mold, curing being conducted under pressure for 25 minutes at 320° F. The cured metal-rubber-metal sandwiches were cooled to room temperature and pulled apart at 2 inches per minute using a Dillon tester. Peel test: 1" x 3" x 3/16" steel bars were gritblasted and degreased with MEK. The adhesive was then brush applied and allowed to dry, leaving an area on one end of each bar uncemented. A 5/16" thick, rubber stock was compression molded to each cemented surface for 30 minutes at 350° F. The cured assemblies were allowed to cool to room temperature. Then the rubber was peeled from the metal at a 90° angle using a Scott tester at 2 inches per minute.

Adhesive compositions A–H inclusive were made up as shown in Table 2.

TABLE 2

| Polymer solution from Example No. | Dibasic lead phosphite (parts) | Resorcinol (parts) | Silica (parts) | Hexamethylene tetramine (parts) | Carbon black (parts) |
|---|---|---|---|---|---|
| A | 1 | 83.5 | | | | |
| B | 1 | 83.5 | 11 | | | |
| C | 1 | 83.5 | 11 | 11 | | |
| D | 1 | 83.5 | 11 | | 0.45 | |
| E | 1 | 83.5 | 11 | 11 | 0.45 | 8.35 |
| F | 2 | 83.5 | 11 | 11 | 0.45 | 8.35 |
| G | (*) | 83.5 | 11 | 11 | 0.45 | 8.35 |
| H | (**) | 83.5 | 11 | 11 | 0.45 | 8.35 |

*The graft polymer of Composition G was made as described in Example 1 except that 54.4 gm. of dicyclopentadiene were substituted for the hexachlorocyclopentadiene of Example 1. During the graft reaction, the dicyclopentadiene was cracked to form cyclopentadiene. The yield of graft polymer was 195.5 gm. (dry basis).
**The graft polymer of Composition H was made as described in Example 1 except that 191 gm. of 1,2,3,4-tetrachloro-5,5,-dimethoxycyclopentadiene were substituted for the hexachlorocyclopentadiene of Example 1. The yield of graft polymer was 348.6 gm. (dry basis).

Compositions B–F inclusive and H are adhesive compositions of this invention. Composition A does not contain any resorcinol and composition G includes unsubstituted cyclopentadiene as the monomer portion of the graft polymer.

The tensile and peel tests described above were performed in duplicate using each adhesive composition A–H and using three different rubber stocks. Stock 1 was an SBR type, stock 2 was a polychloroprene type and stock 3 was a natural rubber formulation.

For comparative purposes, test specimens illustrating the prior art two step and one step bonding methods were prepared. The two-step test specimens were prepared by first coating the steel buttons and bars with a primer coat (Thixon P–3), allowing the primer coat to dry, coating the dried primer coat with a cover coat (Thixon CB–2), and pressing the rubber buttons and bars against the latter to produce the test composite structures. The one step specimens were prepared in a similar way except that only one coat (Thixon D–8822) was brushed on the steel buttons before the rubber was pressed thereon.

Failure of these test specimens, particularly the tensile specimens, can occur at a number of points in the specimens such as at the metal-adhesive interface, in the adhesive and in the rubber stock. For comparison purposes, the relative percent failure in the rubber was noted. A value of 100% stock indicates that failure occurred only in the rubber and that the adhesive and the adhesive-metal and adhesive-rubber interfaces retained their integrity. On the other hand, a low percent stock value generally indicates a poor adhesive. However, because of the characteristics of the organic adhesive and rubber stock, as compared to the more predictable mechanical properties of metals, a low percent stock value may be accompanied by a high tensile value (adhesive C with stock 2) and, when so accompanied, it indicates a good adhesive.

The data from the aforedescribed tensile and peel tests are set forth in Table 3.

TABLE 3

| | Stock 1 | | Stock 2 | | Stock 3 | | Stock 1 | |
|---|---|---|---|---|---|---|---|---|
| | Percent stock | Tensile (lbs./in.²) | Percent stock | Tensile (lbs./in.²) | Percent stock | Tensile (lbs./in.²) | Percent stock | Peel (lb./in.) |
| A | 5 | 704 | 65 | 605 | 25 | 462 | 0 | 0 |
| B | 77.5 | 1,035 | 65 | 825 | 59 | 1,273 | 100 | 160 |
| C | 75 | 1,194 | 10 | 1,210 | 96 | 1,465 | 100 | 152.5 |
| D | 74 | 1,119 | 41 | 1,000 | 77 | 1,308 | 100 | 158.5 |
| E | 95 | 1,338 | 47.5 | 1,395 | 84 | 1,509 | 100 | 152.5 |
| F | 94.5 | 1,447 | 88.5 | 930 | 100 | 1,385 | 100 | 140 |
| G | 2.5 | 538 | 0 | 280 | 42.5 | 286 | 10 | 87.5 |
| H | 94 | 1,447 | 0 | 988 | 94.5 | 1,432 | 100 | 146 |
| Prior art one-coat | 82.5 | 1,320 | 52.5 | 864 | 95.5 | 1,497 | 62.5 | 115 |
| Prior art one-coat | 50 | 843 | 0 | 478 | 47.5 | 1,032 | 82.5 | 125 |

As can be seen from Table 3, adhesives B–F and H, which were representative of the herein-described invention, were generally superior to the other non-invention adhesives. Adhesive A, without resorcinol, provided relatively low tensile results and essentially no peel strength. By comparison, the mere addition of resorcinol to adhesive A (adhesive B) produced substantially improved tensile and peel results. Adhesive G, containing unsubstituted cyclopentadiene, also gave poor test results. The tensile strengths therefrom were only about one-third or less of the tensile strengths obtained using the adhesives representing this invention and the accompanying percent stock values were generally very low.

The tensile test results from the adhesives representing this invention (B–F and H) are comparable to those of the prior art two-step bonding method and were substantially better than the prior art one-step method. Additionally, adhesives B–F and H produced superior peel test results compared to both the prior art one- and two-step methods.

The adhesive composition has been described as an adhesive for bonding rubber to metal. In addition to this use, it also may be employed to bond a variety of similar and dissimilar surfaces together. For example, the following combinations may be successfully bonded: rubber-metal; rubber-rubber; metal-metal; and rubber-wood.

We claim:
1. An adhesive composition comprising:
a graft polymer consisting of
(a) a member of the group consisting of polybutadiene and halogenated polybutadiene, each said member having a molecular weight between about 2000 and about 250,000, the halogen content of said halogenated polybutadiene being in the range of up to about 50% by weight of the weight of said polybutadiene, and
(b) substituted cyclopentadiene monomer selected from the group consisting of hexachlorocyclopentadiene, hexabromocyclopentadiene, 1,2,3,4-tetrachloro-5,5-dimethoxycyclopentadiene, and 2',3',4',5' - tetrachloro - 1,3-dioxalane-2-spirocyclopenta - 2',4'-diene, the ratio of said substituted cyclopentadiene monomer to the butadiene monomer units in said polybutadiene and said halogenated polybutadiene being between about 0.2–1.5 moles to 3 moles;

said graft polymer being present in an amount of 100 parts by weight;
dibasic lead phosphite in an amount between about 25 parts and about 150 parts by weight;
resorcinol in an amount between about 2.5 parts and about 25 parts by weight; and
a volatile solvent for said graft polymer.

2. The adhesive composition of claim 1 in which the solids content is between about 20% and about 30% by weight of the total composition.

3. The adhesive composition of claim 1 wherein said halogenated polybutadiene is one of chlorinated or brominated polybutadiene.

4. The adhesive composition of claim 1 wherein said halogenated polybutadiene is chlorinated, brominated polybutadiene.

5. The adhesive composition of claim 1 wherein said halogen content of said halogenated polybutadiene is between about 22% and about 30% by weight of the weight of said polybutadiene.

6. The adhesive composition of claim 1 wherein said dibasic lead phosphite is present in an amount between about 25 parts and about 100 parts by weight.

7. The adhesive composition of claim 1 wherein said resorcinol is present in amounts between about 7.5 parts and about 15 parts by weight.

8. The adhesive composition of claim 1 which includes, in addition, a dispersing and anti-settling agent in an amount between about 1 part and about 15 parts by weight.

9. The adhesive composition of claim 8 wherein said dispersing and anti-settling agent is selected from the group consisting of fumed silica and sodium aluminosilicate.

10. The adhesive composition of claim 1 which includes, in addition, a formaldehyde donor selected from the group consisting of para-formaldehyde, trioxane and hexamethylenetetramine, said formaldehyde donor being present in amounts between about 0.1 part and about 16 parts by weight.

11. The adhesive composition of claim 1 which includes, in addition, carbon black in an amount between about 1 part and about 15 parts.

12. An adhesive composition comprising:
a graft polymer consisting of
(a) a member of the group consisting of polybutadiene, chlorinated polybutadiene and brominated polybutadiene, each said member having a molecular weight between about 2000 and about 250,000, the halogen content of the halogenated polybutadiene member being in the range of between about 22% and about 30% by weight of the weight of said polybutadiene, and
(b) substituted cyclopentadiene monomer selected from the group consisting of hexachlorocyclopentadiene, hexabromocyclopentadiene, 1,2,3,4-tetrachloro-5,5-dimethoxycyclopentadiene, and 2',3',4',5' - tetrachloro - 1,3-dioxalane-2-spiro-cyclopenta - 2',4'-diene, the ratio of said substituted cyclopentadiene monomer to the butadiene monomer units being between about 0.2–1.5 moles to 3 moles,
said graft polymer being present in an amount of 100 parts by weight;
dibasic lead phosphite in an amount between about 25 parts and about 100 parts by weight;
resorcinol in an amount between about 7.5 parts and about 15 parts by weight;
a dispersing and anti-settling agent selected from the group consisting of fumed silica and sodium aluminosilicate in an amount between about 1 part and about 15 parts by weight;
a formaldehyde donor selected from the group consisting of para-formaldehyde, trioxane and hexamethylenetetramine, said formaldehyde donor being present in amounts between about 0.1 part and about 16 parts by weight;
carbon black in an amount between about 1 part and about 15 parts; and
a volatile solvent for said graft polymer.

13. The adhesive composition of claim 12 in which the solids content is between about 20% and about 30% by weight of the total composition.

14. A method for producing an adhesive composition suitable for metal-rubber bonding, comprising the steps of:
reacting
(a) a member of the group consisting of polybutadiene, chlorinated polybutadiene and brominated polybutadiene, each said member having a molecular weight between about 2000 and about 250,000, the halogen content of the halogenated polybutadiene member being in the range of between about 0% and about 50% by weight of the weight of said polybutadiene, and
(b) substituted cyclopentadiene monomer selected from the group consisting of hexachlorocyclopentadiene hexabromocyclopentadiene, 1,2,3,4-tetrachloro - 5,5-dimethoxycyclopentadiene, and 2',3',4',5' - tetrachloro-1,3-dioxalane-2-spiro-cyclopenta-2',4'-diene, the ratio of said substituted cyclopentadiene monomer of the butadiene monomer units being between about 0.2–1.5 moles to 3 moles,
in solution at an elevated temperature between about 110° C. and about 165° C. until substantially all of said (b) has been grafted on to said (a), the ratio of said (b) to said (a) in said solution being sufficient to produce a graft polymer in which the ratio of said (b) to the polybutadiene monomer units in said (a) is between about 0.2–1.5 moles to 3 moles;
admixing 100 parts by weight of said graft polymer with about 25 parts to about 150 parts by weight of dibasic lead phosphite and with about 2.5 parts to about 25 parts by weight of resorcinol in a volatile solvent for said graft polymer.

15. The method of claim 14 in which said volatile solvent is present in amount sufficient to provide a solids content of between about 20% and about 30% (wt.).

16. The method of claim 14 in which the solvent in said reaction solution is the same as said volatile solvent.

17. The method of claim 16 which includes the additional step of evaporating an amount of said solvent sufficient to produce an adhesive composition having a solids content between about 20% and about 30% (wt.).

References Cited

UNITED STATES PATENTS

| 3,268,475 | 8/1966 | Hoch | 260—879 |
|---|---|---|---|
| 3,462,407 | 8/1969 | Witschard | 260—879 |
| 3,313,760 | 4/1967 | Barnes | 260—45.75 |

OTHER REFERENCES

Rubber World, "Materials and Compounding Ingredients for Rubber 1968," pp. 130, 361.

MORRIS LIEBMAN, Primary Examiner

P. R. MICHL, Assistant Examiner

U.S. Cl. X.R.

156—333; 260—32.8 A, 33.8 UA, 879